United States Patent [19]

d'Auria

[11] 4,145,802

[45] Mar. 27, 1979

[54] AUTOADAPTIVE TACTILE DEVICE FOR WORKING MACHINES

[75] Inventor: Antonio d'Auria, Ivrea (Turin), Italy

[73] Assignee: Ing. C. Olivetti & C., S.p.A., Ivrea (Turin), Italy

[21] Appl. No.: 718,040

[22] Filed: Aug. 26, 1976

[30] Foreign Application Priority Data

Sep. 3, 1975 [IT] Italy .................................. 69197 A/75

[51] Int. Cl.² .............................................. B23Q 1/08
[52] U.S. Cl. ...................................... 29/568; 29/26 A; 414/749
[58] Field of Search ........................ 29/568, 26 A, 33; 214/1 BB, 1 BE, 1 BH, 1 BT, 1 BC; 144/32; 81/57.4, 57.24; 408/3; 294/88

[56] References Cited

U.S. PATENT DOCUMENTS

| 3,028,770 | 4/1962 | Pittwood | 29/568 X |
|---|---|---|---|
| 3,030,695 | 4/1962 | White et al. | 29/26 A |
| 3,135,985 | 6/1964 | Swanson et al. | 29/568 X |
| 3,934,629 | 1/1976 | Boman | 144/32 R |

Primary Examiner—Horace M. Culver
Attorney, Agent, or Firm—Schuyler, Birch, Swindler, McKie & Beckett

[57] ABSTRACT

An automatic industrial robot is provided with an autoadaptive tactile device connected to a tool for performing at least one operation upon a workpiece. The tool is carried by a working head including a toolholder, and control means for effecting relative movement between the workpiece supporting means and the working head so as to bring a tool in the toolholder into a predetermined position relative to the workpiece subject to a certain tolerance. The toolholder is connected to the working head by a coupling which can be selectively freed to allow limited shifting of the toolholder relative to the working head and clamped so as to clamp the toolholder relative to the working head.

20 Claims, 12 Drawing Figures

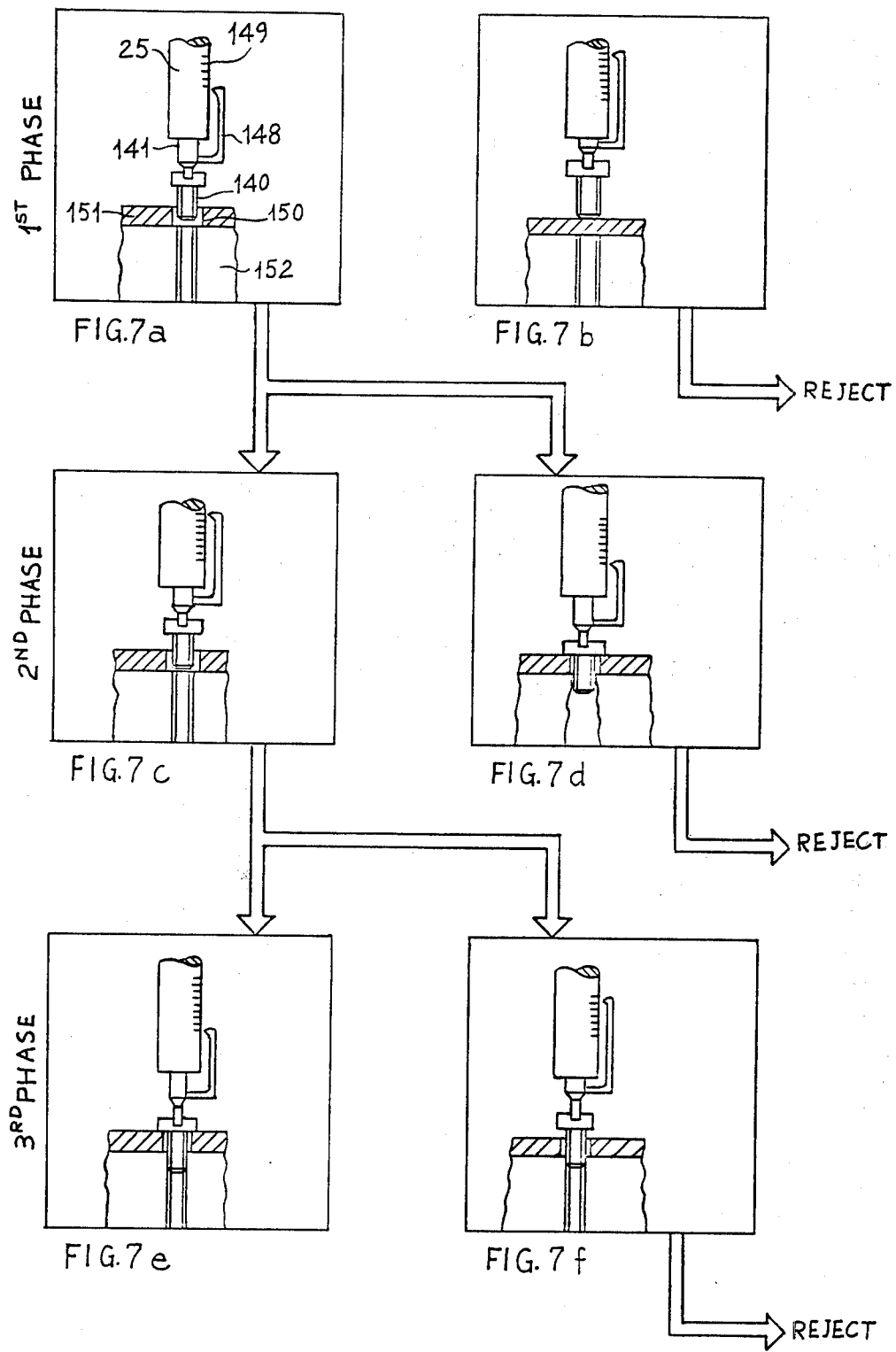

AUTOADAPTIVE TACTILE DEVICE FOR WORKING MACHINES

BACKGROUND OF THE INVENTION

The present invention relates to an autoadaptive tactile device for a working center adapted to perform at least one operation upon a workpiece and comprising means for supporting the workpiece, a working head including a toolholder, and control means for effecting relative movement between the supporting means and the working head.

In particular, the machine may be a so-called machining centre with more than one working head.

In very high precision machining centres, the relative movement between the workpiece to be machined and a given working head is commanded under numerical control by means of very costly equipment which ensures very high precision. These machining centres operate satisfactorily with working heads equipped with tools, for example, for drilling, but cannot be adapted for fitting or assembling working heads, in which a predetermined position must be reached precisely, for example in order to fit or join together two mechanical parts.

Autoadaptive tactile devices capable of bringing a particular tool over a given position of a workpiece subject to a certain tolerance and of thereafter sensing or testing the workpiece itself in accordance with a predetermined law until the tool is arrested exactly in the desired position have already been proposed. These known autoadaptive tactile devices also require very sophisticated and costly electronic apparatus for command of the relative movements. They, moreover, have the disadvantage that they act as if mechanically rigid, so that failure of the electronic control to operate properly may lead to damage.

The object of the invention is to provide an autoadaptive tactile device which does not require any equipment for control of the movement after the approximate positioning of the tool relative to the workpiece and which lends itself both to positioning a machining tool and to positioning a fitting or assembly tool.

SUMMARY OF THE INVENTION

The present invention is directed to a machine working center having one or more autoadaptive tactile devices each of which includes a novel coupling device to couple a tool and tool holder to the working head of the autoadaptive tactile device. The working center includes a worktable on which a workpiece is supported. The autoadaptive tactile device includes a working head, a tool to perform at least one operation upon the workpiece, a tool holder for supporting the tool and the above-mentioned coupling device for coupling the tool and the tool holder to the working head. The working center includes positioning means for positioning the working head relative to a predetermined position on the workpiece. The positioning means positions the working head within a given tolerance or limited precision. Upon positioning the working head relative to the predetermined position, the tool coupled to the working head by the coupling device is moved in a direction towards the workpiece to enable the tool to perform the appropriate operation upon the workpiece. The coupling device of the present invention has two different operative conditions which are controlled by control means in the working center. In the first operative condition, during the movement of the tool in a direction toward the workpiece, the coupling device permits a limited shifting of the tool and the tool holder relative to the working head in response to the engagement of the tool with the workpiece. This limited shifting of the tool relative to the working head permits the tool to assume the proper operative position. In the second operative condition of the coupling device, the tool and the tool holder are rigidly clamped to the working head of the autoadaptive tactile device in order to permit the tool to perform the appropriate operation on the workpiece.

BRIEF DESCRIPTION OF THE DRAWINGS

The invention will be described in more detail, by way of example, with reference to the accompanying drawings, in which:

FIG. 6 is a view, partly in section, of a detail of a variant of the device of FIG. 3; and FIGS. 7a to 7f show diagrammatically a series of stages of the work carried out by the variant of FIG. 6.

DESCRIPTION OF THE PREFERRED EMBODIMENTS

Figure 1:
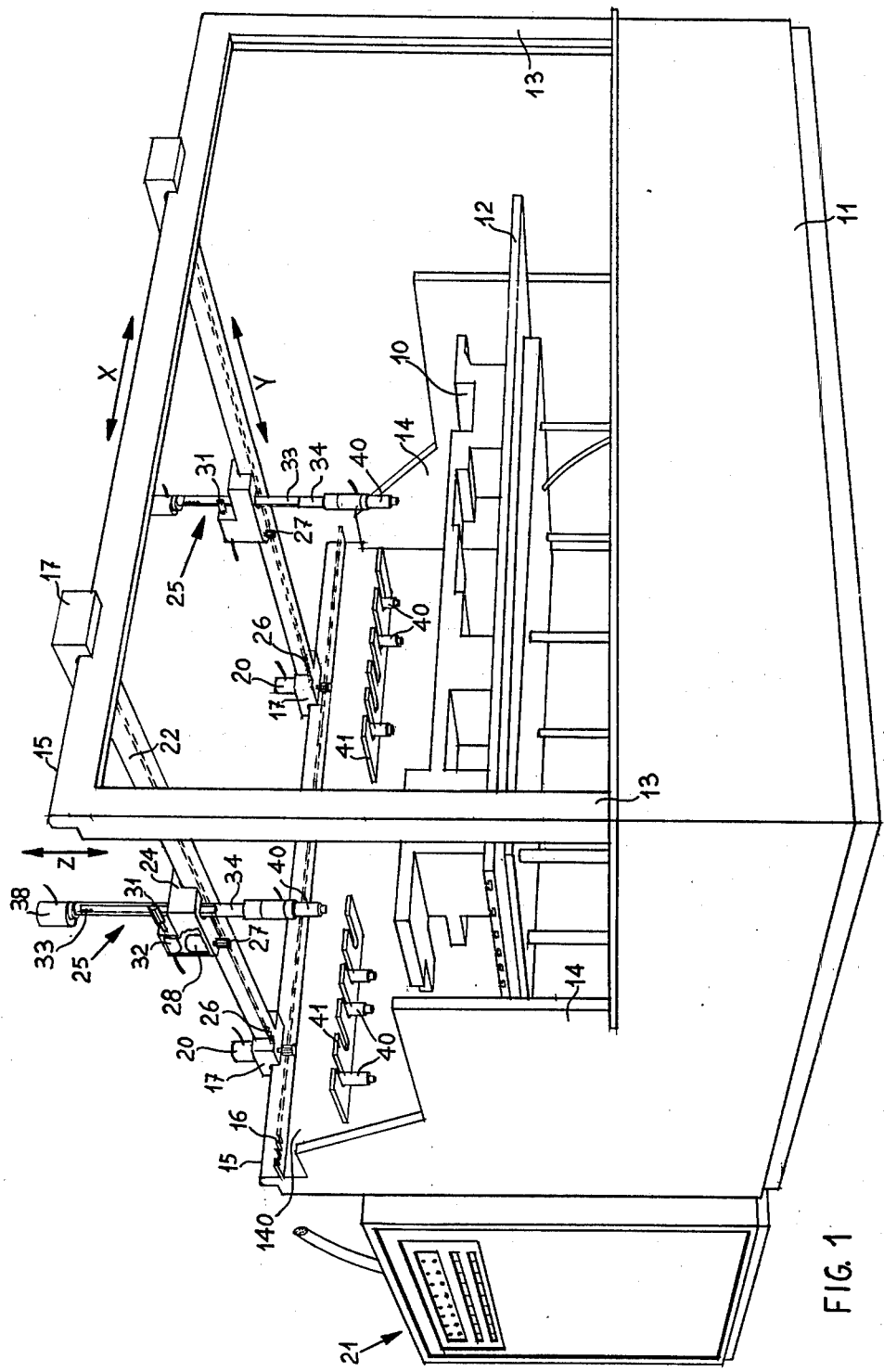
FIG. 1 is a diagrammatic perspective view of a machining centre embodying the invention.

Referring to FIG. 1, the bed 11 of a machining centre is equipped with a fixed worktable 12 on which a workpiece 10 to be machined is fixed. To the bed 11 there are fixed two front uprights 13 spanned by a rail 15. To the rear of the bed there are upstanding side walls 14 spanned by a back wall 140 on top of which is a second rail 15 and an adjacent rack 16. The rails 15 are spanned by a plurality of fore-and-aft beams whose ends 17 are in the form of carriages running on the rails. At the rear of each beam a pinion in engagement with the fixed rack 16 can be rotated by a stepping motor 20. This is commanded, by means of a number of pulses proportional to the movement that the corresponding beam 22 must make along the axis X, by a corresponding control unit 21.

Working heads 25 have carriages 24 which can run in the Y axis direction along the beams 22. To this end each carriage 24 carries a pinion 27 which meshes with a rack 26 fixed to the beam 22 and is driven by a second stepping motor 28 controlled by the unit 21.

Each carriage 24 is provided with a third pinion 31 (FIG. 2) rotated by a third stepping motor 32 which is also controlled by the unit 21. The pinion 31 meshes with a rack 33 formed on a barrel 34 of the working head 25 for the movement of the head along the axis Z. A shaft 36 is rotatable in the barrel 34 and is connected by means of a gear box 37 to an electric motor 38 for rotating a tool 39 carried by a toolholder 40. The toolholder 40 is mounted removably on the working head 25 in a manner which will be seen hereinafter.

Figure 5:
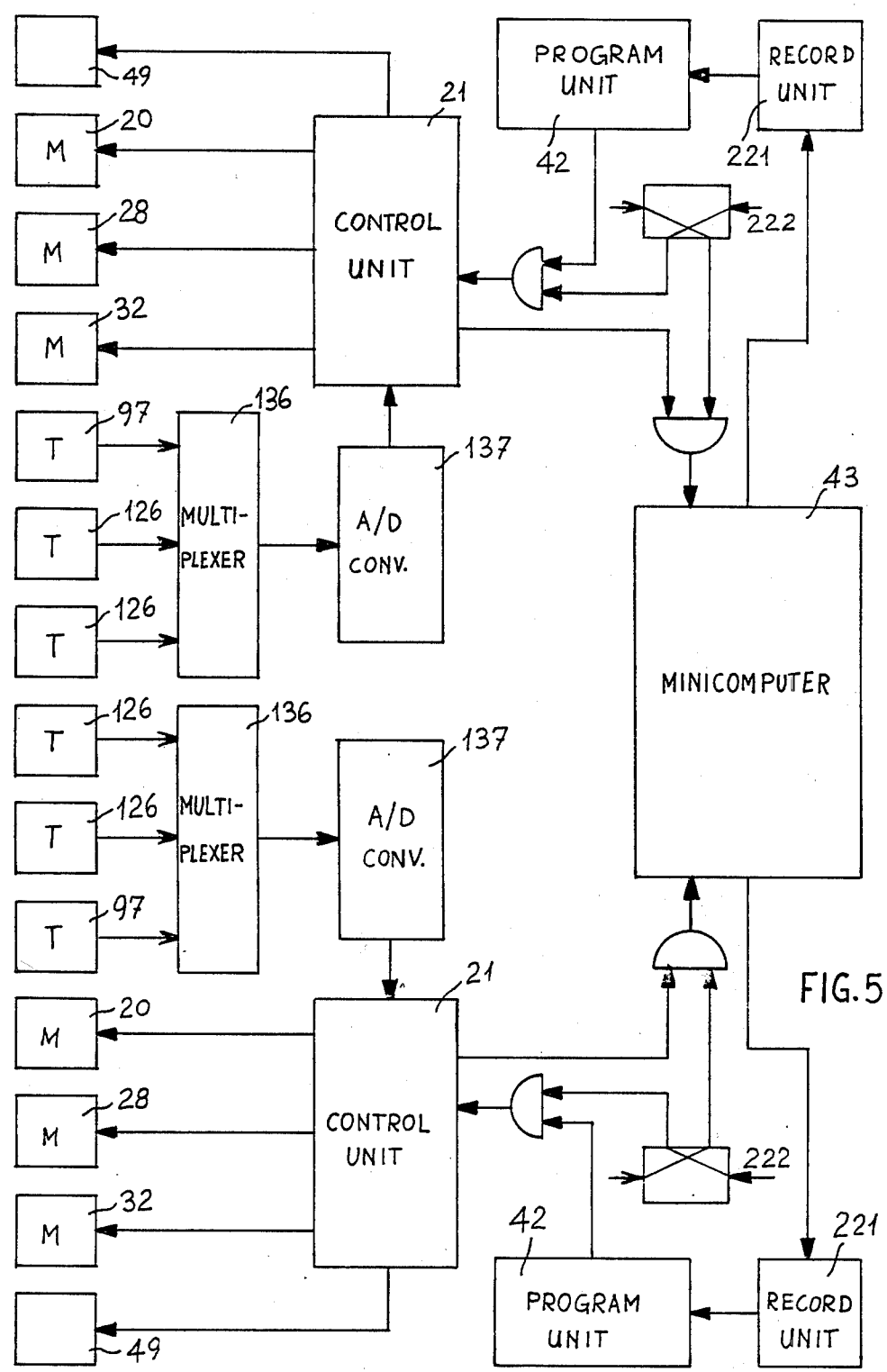
FIG. 5 is a diagram of the control system of the machining centre of FIG. 1.

The changing of the toolholder 40 according to the working operations to be carried out is effected automatically. To this end, on the back wall 140 (FIG. 1) there are mounted tool racks 41 in which the various toolholders 40 to be used are arranged in predetermined positions. Two program units 42 (FIG. 5) are adapted to supply the units 21 with the information needed by the stepping motors 20, 28 and 32 for allowing each head 25 to put down the tool which has been working in the respective position, search for the new tool, take up the new tool from the corresponding rack 41 and position the head 25 in the required position with respect to the workpiece 10.

The two program units 42 are commanded through a data processor 43, for example a scientific mini-computer. For each head 25, a recording unit 221 adapted to be activated by a manual control including a flip-flop 222 allows the recording of the programs in the manner described in our Patent Application.

The toolholder 40 (FIG. 2) is connected to the working head 25 by means of a coupling 45, which can either be freed for allowing a certain shifting of the toolholder 40 with respect to the head 25, or clamped for clamping the toolholder 40 rigidly to the head 25. The coupling 45 comprises a first member constituted by a sleeve 46 fixed to the barrel 34. The sleeve 46 carries at the bottom a bronze ring 47 which has a plane bearing surface 48 for a second member of the coupling 45 constituted by a disc 52 of the toolholder 40.

Moreover, in the sleeve 46 there is disposed an electromagnet 49 having a winding 50 which can be energised, under the control of the respective unit 21 (FIG. 5), with two different voltages: a first voltage of 8 volts and a second voltage of 24 volts. The electromagnet 49 has an air gap between two parts, one of which is the core 51 of the winding 50, while the other is constituted by the disc 52 of the toolholder 40.

The disc 52 is provided with two holes 53 adapted to engage two axial pins 54 fixed to the core 51 of the electromagnet 49 in diametrically opposite positions. The holes 53 have a diameter larger than that of the pins 54 and such as to permit a certain movement of the toolholder 40 with respect to the sleeve 46.

The toolholder 40 is, moreover, provided with a stub 56 rotatable together with the tool 39 and adapted to engage with the spindle of the head 25. This spindle comprises a sleeve 57 which is provided at the top with two like helical slots 58 disposed at 180° on from the other.

Two radial pins 59 carried by a gudgeon 60 connected to the shaft 36 through a universal joint 61 engage in the slots 58. Between the sleeve 57 and the gudgeon 60, there is disposed a compression spring 62 which urges the sleeve 57 towards a low position as indicated in the drawing.

The stub 56 of the toolholder 40 is provided with two radial pins 63 adapted to engage in two slots 64 of the sleeve 57 to carry the tool 39 along in rotation. A series of balls 66 held by a resilient ring 67 serve to retain the toolholder 40 axially in the absence of full energisation of the electromagnet 49.

In the sleeve 46, there is moreover formed an annular duct 68 which is supplied with compressed air through a flexible tube 69. The duct 68 is in communication by means of four axial ducts 71, only one of which can be seen in FIG. 2, with as many nozzles 72 formed in the bronze ring 47, so as to form an air bearing or cushion between the surface 48 of the ring 47 and the corresponding surface of the disc 52.

Finally, in the ring 47 there is disposed a sensor 73 adapted to signal the presence of the toolholder 40 and stop both the supply of air and the energisation of the electromagnet 49 until a toolholder 40 is connected to the head 25.

The autoadaptive device of FIG. 2 operates in the following manner. When the working head 25 is brought into correspondence with the new tool 40 on the rack 41 (FIG. 1), the toolholder 40 is already oriented so that the holes 53 are in correspondence with the axial pins 54 (FIG. 2), the sleeve 57 may be located in any angular position with respect to the stub 56. If the pins 63 do not engage the slots 64, the sleeve 57 is pushed upwardly in opposition to the action of the spring 62. The helical slots 58 co-operating with the pins 59 then cause the sleeve 57 to rotate until the slots 64 are aligned with the pins 63. The spring 62 then causes the sleeve 57 to jump downwardly and overcome the force of the resilient ring 67 and reach the position of FIG. 2.

The control unit 21 (FIG. 5) now causes the electromagnet 49 to be energised with the voltage of 8 volts and commands the sending of compressed air through the tube 69 into the ducts 68 and 71. The pressure of the air is regulated in such manner that its action through the nozzles 72 on the disc 52 nearly counterbalances the action of the electromagnet 49. The electromagnet 49, therefore, retains the toolholder 40 but radial movement of the toolholder can take place within the limits permitted by the holes 53, assisted by the air bearing between parts 48 and 52. This movement is also transmitted to the sleeve 57 and to the gudgeon 60, while the shaft 36 is able to remain still owing to the universal joint 61.

With the toolholder 40 connected in this way to the working head 25, the latter is now shifted under the control of the units 21 and 42 (FIG. 5) until it reaches, within the tolerance or limited precision established by the stepping motors 20 and 28, the desired position of the workpiece 10 (FIG. 2), represented an an example by a small countersunk hole 75 in a bushing in the workpiece 10.

The working head 25 is now moved downwardly by the stepping motor 32 to engage the tool 39 with the hole 75. If the tool 39 is not exactly aligned with the hole 75, this engagement causes a shifting of the tool 39 with respect to the shaft 36. As soon as the desired position is reached by the tool 39, the stepping motor 32 stops because the tool 39 has reached the limit of its advance. The motor 32 then sends a signal to the control unit 21, which commands the energisation of the electromagnet 49 with a voltage of 24 volts and the stopping simultaneously of the supply of air to the tube 69. The toolholder 40 thus remains rigidly fixed to the sleeve 46 and the motor 38 can be actuated for the machining.

At the end of the machining, the working head 25 is first raised and then moved so as to bring the toolholder 40 back over the rack 41. The electromagnet 49 is now completely de-energised and compressed air is sent to the nozzles 72. The compressed air, no longer balanced by the energisation of the electromagnet 49, is now able to overcome the action of the resilient ring 67 on the balls 66, so that the toolholder 40 is detached from the working head 25, being set down in the corresponding seat in the rack 41 (FIG. 1).

According to another embodiment of the invention, the working head 25 is adapted to carry a tactile tool, for example of the type described in U.S. Pat. No. 3,906,325 assigned to the same assignee as the present invention. The carriage 24 of the working head 25 carries a vertically slidable barrel 34' (FIG. 3) similar to the barrel 34 of FIG. 2. Below the barrel 34, there is fixed a sleeve 77 to which a bronze ring 78 is fixed. In the ring 78 there are formed four axial ducts 79 fed by a circular duct 80 and terminating in a nozzle 81 at the lower surface.

Figure 2:
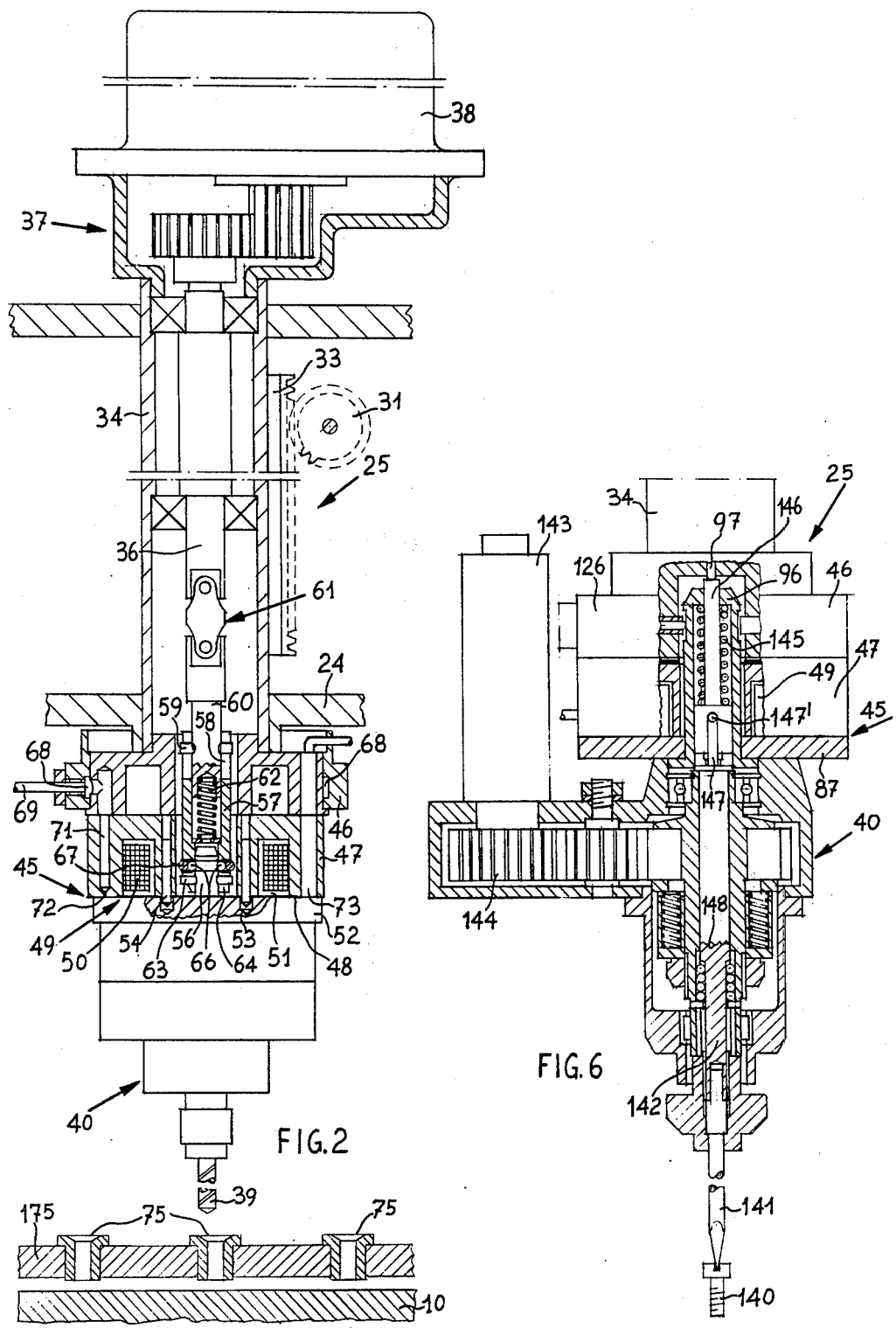
FIG. 2 is a partial median section of a first form of autoadaptive tactile device.

The sleeve 77 carries an electromagnet 49 similar to that of FIG. 2, the magnetic circuit of which comprises a disc 87 connected to a toolholder 88. The disc 87 bears a sleeve 89 in which there can slide with a certain stroke a plunger 91 fixed at the bottom to a disc 92 of the toolholder 88. The disc 92 is linked angularly to the disc 87 by means of a pin 93 in engagement with a slot 94 in the disc 87. The plunger 91 is provided at the top with a stub 96 adapted to be sensed at the top by a transducer 97 for the axis Z which is adapted to signal in a known manner any axial movement of the stub 96.

Between the stub 96 and a shoulder 98 of the sleeve 89, there is disposed a first compression spring 99, while between the disc 92 and the sleeve 89 there is disposed a second spring 101. The action of the spring 99 prevails over the action of the spring 101, as a result of which the toolholder 88 normally adopts the high position of FIG. 3.

The disc 87 is provided with two diametrically opposite holes 102 (FIG. 4) adapted to engage with a certain play a pair of fixed pins 103 carried by the ring 78. On the ring 78 there are, moreover, disposed two resilient pins 104 which are also diametrically opposite and alternate with the pins 103. Each pin 104 is fixed to a piston 106 (FIG. 3) slidable in a cylinder 107 of the ring 78 and biased downwardly by a compression spring 108. The pins 104 are adapted to engage with slots 109 in the disc 87 whenever the tool carried by the latter must move only along the axis X.

Figure 3:
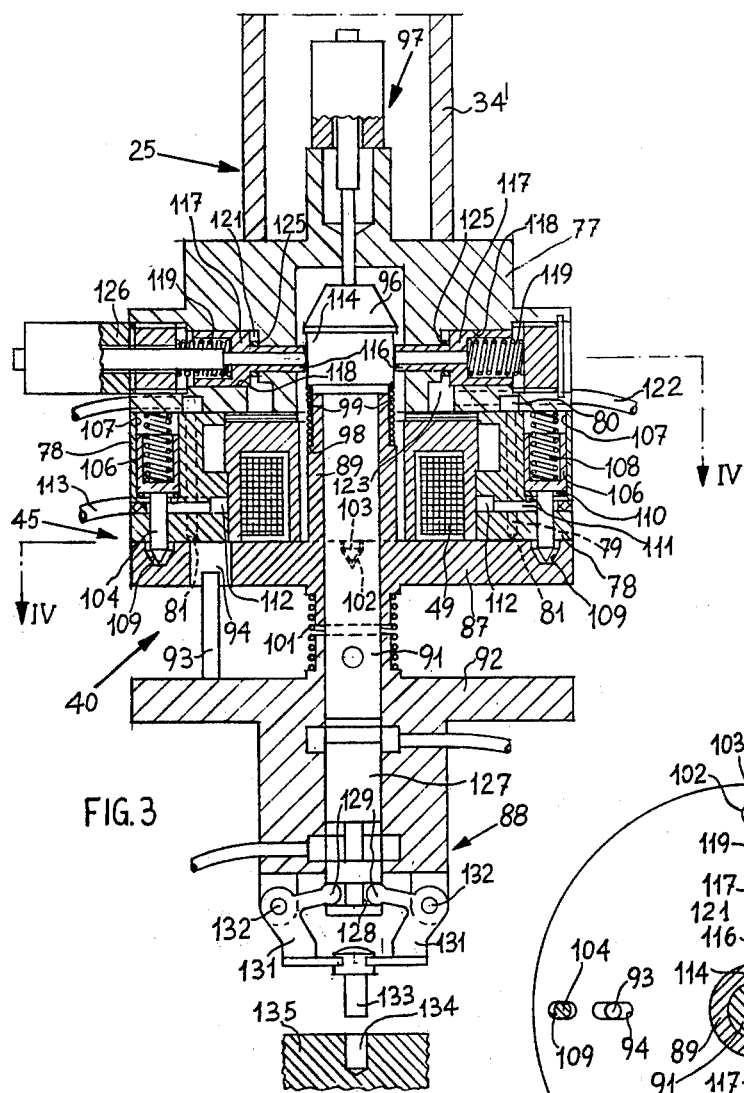
FIG. 3 is a partial median section of a second form of the device.

Between the lower face of the piston 106 and the cylinder 107, there is an air chamber 110 fed by means of radial ducts 111 and an annular duct 112 with the air supplied through an external tube 113 (FIG. 3).

Four hollow centering plungers 116 disposed radially at 90° from one another and each integral with a piston 117 slidable in a cylindrical recess 118 can co-operate with a cylindrical surface 114 of the stub 96. A spring 119 biases each piston 117 inwardly, while compressed air can be delivered to an annular chamber 121 through a series of conduits 122, 123. Each piston 117 is normally arrested against a ring 125 (FIG. 3) so as to leave a certain clearance between the end of a centering plunger 116 and the surface 114. Two of the plungers 116 disposed at 90° from one another in a corresponding manner to the axes X and Y each accommodate a position transducer 126 similar to the transducer 97.

The toolholder 88 comprises a piston 127 which is movable vertically by pneumatic means and provided at the bottom with a groove 128 which is engaged by two projections 129 of two jaws 131. These jaws are pivoted on two pins 132 of the toolholder 88 and are adapted to grip a part 133 to be fitted into a seat 134 in a part 135.

Figure 4:
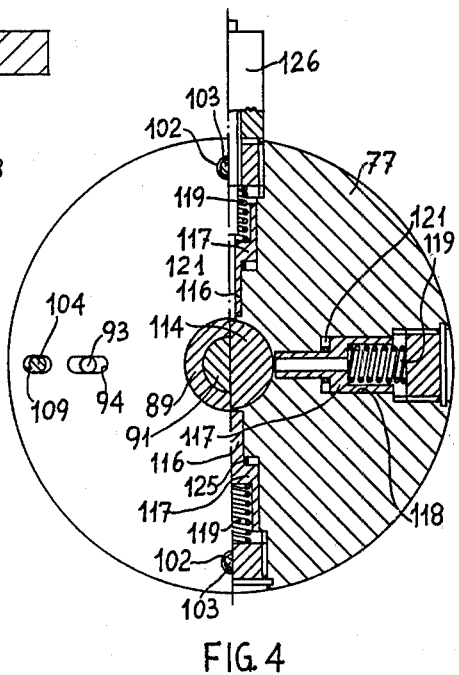
FIG. 4 is a section on the line IV—IV of FIG. 3.

The working head of FIGS. 3 and 4 operates in the following manner. Let it be assumed in the case of FIGS. 3 and 4 that the tool 88 is allowed to move in the two directions X and Y, so that the slots 109 will not be concerned and, if this were the sole use envisaged for the system, could be omitted from the disc 87.

Firstly, the program unit 42 and control unit 21 (FIG. 5) cause the working head 25 to be shifted to bring the head into correspondence with the toolholder 40 selected in the rack 41 (FIG. 1). The control unit 21 (FIG. 5) now causes compressed air to be sent to the tube 113 (FIG. 3), so that via the ducts 112 and 111 the pins 104 are retracted by overcoming the spring 108. Moreover, the unit 21 now causes the electromagnet 49 (FIG. 3) to be energised with the voltage of 8 volts, connecting the disc 87 to the working head 25.

The action of the springs 119 on the pistons 117 now produces a first centering of the plunger of the toolholder on the working head 25. Thereafter, compressed air is sent to the conduits 123 and 122, thus retracting the four plungers 116, and compressed air is sent into the nozzles 81 so as to render the disc 87 easily movable with respect to the head 25, as seen in the case of FIG. 2. Then, through the medium of the unit 21 (FIG. 5), the program unit 42 causes the tool 88 to move to a station, not shown in the drawing, at which there is a supply of pins 133 (FIG. 3). The piston 127 is now actuated, causing it to move upwardly so that the jaws 131 grip a pin 133, as indicated in FIG. 3. Since the pin 133 is unlikely to be in the theoretical position defined by the commands of the program unit 42, on the closing of the jaws 131 the tool 88 shifts with respect to the working head 25 by causing the disc 87 to float on the ring 78. This action is promoted by the compressed air sent to the nozzles 81 so as to form an air bearing between the two surfaces of the disc 87 and the ring 78 which are in juxtaposition.

At the end of the stroke of the piston 127, the head 25 is moved upwardly and the compressed air is removed from the conduits 123 and 122. Through the medium of the plungers 116, the spring 119 now produce the centering of the plunger 91 together with the disc 87, the tool 88 and the pin 133. The electromagnet 49 is then energised at 24 volts and the compressed air is excluded from the nozzles 81, as a result of which the toolholder 40 remains rigidly connected to the head 25.

The working head 25 is now brought into correspondence with the seat 134 into which the pin 133 is to be inserted. If the position reached through the command of the unit 21 is not exactly the desired position, there begins a search movement controlled by the three transducers 97 and 126, which are rendered active selectively by the unit 21 through the corresponding multiplexer 136 and send to the mino-computer 43 the corresponding data converted into numerical values by a converter 137. The search movement is commanded by the mini-computer 43 and is effected by a spiral motion of the head 25, substantially as described in to the above-mentioned U.S. Pat. No. 3,906,325.

More particularly, when the pin 133 touches the part 135 without entering the hole 134, the spring 101 is compressed, so that the stub 96 moves upwardly, causing the transducer 97 to emit a signal which, combined with the height that the tool has reached, produces the corresponding search sequence. The spring 101 could also be compressed in other stages of the cycle, for example because of failure to grip the pin or because of lack of success of the search of the part or because of other obstacles that are encountered. The same signal of the transducer 97 then produces as many repeated sequences of the cycle as are necessary. When the desired position is reached, this being signalled by the transducer 97, the pin 133 is inserted in the seat 134, after which the piston 127 is actuated and causes the jaws 131 to open. If the seat 134 or the pin 133 were to be provided with a chamfer or other suitable lead-in means, the search movement could be eliminated, while the movement of insertion of the pin 133 into the seat 134 is performed with the electromagnet 49 energised at 8 volts and the air bearing established.

When the toolholder 40 is to be replaced on the rack 41 (FIG. 1), the control unit 21 causes the head 25 to move into correspondence with the position of the toolholder, after which the electromagnet 49 is completely de-energised and air is again sent to the nozzles 81, so that the compressed air ensures the release of the toolholder 40 from the head 25.

If the part to be fitted is a screw, the toolholder may comprise a screwdriver 141 (FIG. 6) fixed to a spindle 142 which is rotated by its own electric motor 143 through a gear box 144. The stub 96 of the toolholder is now hollow to accommodate a spring 145 disposed between the stub itself and a shoulder of a plunger 146 connected by means of two slots 147 to two pins 147' of the spindle 142. This spindle can, therefore, move with respect to the head 25 owing to the coupling 45, which is similar to that of FIGS. 2 and 3. Moreover, the stub 96 can undergo axial movements with respect to the tip of the screwdriver 141. This movement is detected through the plunger 146 by the transducer 97.

In order to clarify the relative movement of the plunger 146 with respect to the stub 96, the plunger 146 is shown in FIG. 7 as a pointer 148 movable with respect to a scale 149 of the working head 25.

In the first phase (FIGS. 7a, b), if the head 25, under the control of the unit 21 and possibly utilizing the search movement, brings the screw 140 into correspondence with the hole 150 in the part 151, the spring 145 (FIG. 6) is not compressed and the machine goes on to the following stage. If, on the other hand, the spring is compressed, for example because the hole 150 is not found (FIG. 7b), this fact is signalled by the transducer 97, which produces an unconditional jump in the program and the operation stops (reject).

In the second phase (FIGS. 7c, d), the screwdriver 141 advances, but is not yet turned. If the spring 145 is compressed, all is in order and the machine goes on to the following phase; on the other hand, if the spring is not compressed, this means that the threaded part 152 into which the screw 140 is to be screwed is missing, or the screw 140 is missing, or the thread of the screw or of the part is stripped. In this case, the signal of non-compression of the spring 145 given by the transducer 97 (FIG. 6) is to cause the stopping of the operation (reject).

In the third phase (FIGS. 7e, f), the screwdriver 141 is turned until the screw 140 abuts against the part 151, commanding the stopping of the motor 143 (FIG. 6). If all is in order, the spring 145 is not compressed and the fitting is correct. If, on the other hand, the spring 145 is compressed, this means that the screw has not been screwed home and has therefore not come into abutment against the part 151, so that the operation also stops in this case and the part is discarded (reject).

It is, therefore, clear that the energisation of the electromagnet 49 by means of two different currents produces in each case two different conditions of the coupling 45, in the first of which the toolholder 40, 88 can undergo a certain shifting with respect to the head 25, while in the second the toolholder 40, 88 is perfectly clamped with respect to the head 25 itself.

The electromagnet 49 may be replaced by other mechanical or fluodynamic means adapted to be actuated in two different ways to permit the movement of the toolholder on the working head in one way and to clamp the toolholder rigidly to the head in the other way.

What is claimed is:

1. In an autoadaptive tactile device for working on a workpiece, said autoadaptive tactile device including a working head and a tool coupled to said working head for performing an operation on said workpiece, the improvement comprising:
    coupling means having two different operative states for coupling said tool to said working head, said coupling means having a first operative state in which said tool shifts a predetermined amount relative to said working head in response to the engagement of said tool with said workpiece and a second operative state in which said tool is rigidly coupled to said working head; and
    control means associated with said coupling means for controlling said coupling means by selecting one of said two different operative states.

2. An autoadaptive tactile device according to claim 1 wherein said coupling means comprises an electromagnet and said control means selectively energizes the electromagnet either with a first voltage which permits a predetermined amount of shifting to take place between said tool and said working head or a second voltage which clamps said tool to said working head.

3. An autoadaptive tactile device according to claim 2 wherein said coupling means further comprises means for establishing an air bearing which facilitates the shifting of said tool relative to said working head by partially counterbalancing the effect of the energization of said electromagnet with the first voltage.

4. A working center having an autoadaptive tactile device for working on a workpiece comprising:
    supporting means for supporting said workpiece;
    at least one working head;
    at least one tool to perform an operation upon said workpiece;
    coupling means having two different operative states for coupling said tool to said working head, said coupling means having a first operative state in which said tool shifts a predetermined amount relative to said working head in response to the engagement of said tool with said workpiece and a second operative state in which said tool is rigidly coupled to said working head;
    positioning means for positioning said working head within a predetermined tolerance relative to a predetermined position on said workpiece;
    moving means for moving said working head toward said workpiece to cause said tool to engage said workpiece; and
    control means associated with said coupling means for controlling said coupling means by selecting one of said two different operative states, said control means selecting said first state during the movement of said working head by said moving means and selecting said second state thereafter to rigidly clamp said tool on said working head.

5. A working center according to claim 4 wherein said coupling means comprises an electromagnet and said control means selectively energizes the electromagnet with either a first voltage which permits a predetermined amount of shifting to take place between said tool and said workpiece or a second voltage which clamps said tool to said working head.

6. A working center according to claim 5 wherein said coupling means further comprises means for establishing an air bearing which facilitates the shifting of said tool relative to said working head by partially counterbalancing the effect of the energization of said electromagnet with the first voltage.

7. A working center according to claim 5 wherein said coupling means further comprises a first member fast with the working head, a second member fast with said tool and adapted to mate with said first member in a given plane, and restricting means adapted to restrict the relative movement of the said members in said given plane within a predetermined limit.

8. A working center according to claim 7 wherein said working head includes a rotatable spindle for actuating said tool holder, said spindle comprising a first portion rotatable coaxially with said first member, a second portion coupled to said tool and rotatable coaxially with said second member, and a universal joint connecting said first and second portions of said spindler.

9. A working center according to claim 6 wherein said means for establishing an air bearing includes at least one duct for delivering air under pressure to said given plane and means for supplying and regulating the flow of air under pressure to said duct.

10. A working center according to claim 7 wherein said electromagnet has a magnetic circuit divided into two parts by an air gap intersected by said given plane, the two parts being each carried by one of said members.

11. A working center according to claim 10 further comprising sensing means carried by said working head for sensing the position of said workpiece, said control means adapted to control the energizing voltage of the electromagnet selectively as a function of the action of the sensing means.

12. A working center according to claim 8 wherein said second portion engages a sleeve adapted to turn and move axially with respect thereto to permit engagement of said restricting means.

13. A working center according to claim 8 wherein said first portion of said spindle is rotated by a motor carried by said working head.

14. A working center according to claim 7 wherein said tool is secured to a tool holder which includes a support coupled to rotate with said second member and connected axially thereto by means of two springs acting in opposite axial directions.

15. A working center according to claim 14 wherein a series of resilient pistons are arranged to contract the tool when it does not engage said workpiece, a position sensor being associated with at least one of said pistons.

16. A working center according to claim 14 wherein said tool comprises a pair of pincers actuated by a fluodynamic mechanism.

17. A working center according to claim 14 wherein said first member carries two diametrically opposite fixed pins adapted to engage with substantial play in two radial slots of said second member.

18. A working center according to claim 15 wherein said first member carries two diametrically opposite resilient pins alternating with said fixed pins, said second resilient pins being capable of retraction both under the action of said second member and by fluodynamic action.

19. A working center according to claim 14 wherein said tool comprises a screwdriver actuated by an independent motor carried by said tool holder.

20. A working center according to claim 19 wherein said tool is connected resiliently in the axial direction to signal possible abnormalities encountered in the various stages of engagement and of screwing in of said screw.

* * * * *